E. McG. OMEARA.
ABDOMINAL BELT AND UTERINE SUPPORTER.
APPLICATION FILED APR. 28, 1908.
950,514. Patented Mar. 1, 1910.
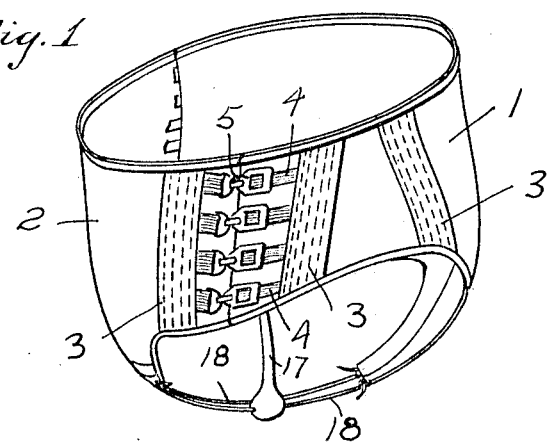
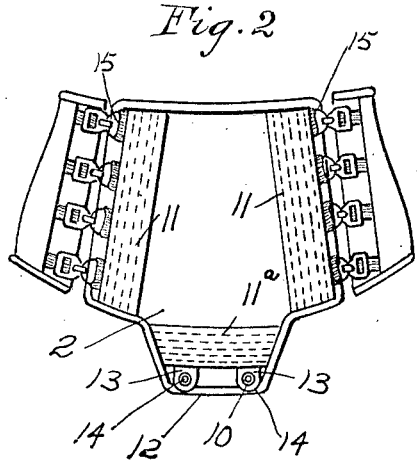
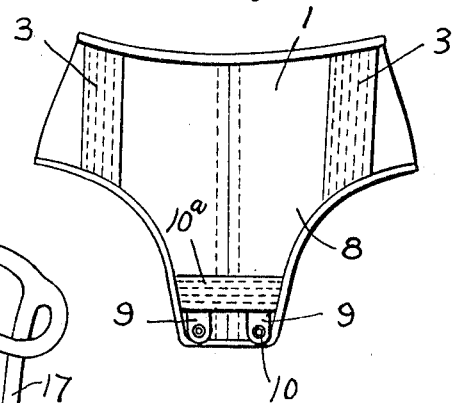
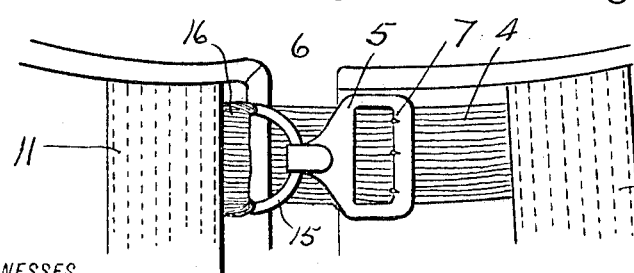
WITNESSES
John F. Cavanagh
E. J. Ogden
INVENTOR
Elizabeth McGovern O'Meara
BY
Howard E. Barlow
ATTORNEY

UNITED STATES PATENT OFFICE.

ELIZABETH McGOVERN OMEARA, OF PROVIDENCE, RHODE ISLAND.

ABDOMINAL BELT AND UTERINE SUPPORTER.

950,514.  Specification of Letters Patent.  Patented Mar. 1, 1910.

Application filed April 28, 1908. Serial No. 429,656.

*To all whom it may concern:*

Be it known that I, ELIZABETH McGOVERN OMEARA, a citizen of the United States, residing at Providence, in the county of Providence and State of Rhode Island, have invented certain new and useful Improvements in Abdominal Belts and Uterine Supporters, of which the following is a specification, reference being had therein to the accompanying drawing.

My invention relates to improvements in a combined abdominal and uterine supporter, and has for its object to provide a belt of simple, inexpensive and of practical construction that will support the lower abdomen and therefore the internal organs and relieve undue pressure on the uterus and its appendages.

A further object of my invention is to so construct said belt that short pieces of very flexible rubber tubing, or the like, may be secured to the lower portion thereof in such a manner as to firmly support a pessary and hold the same with a flexible tension in the desired position, and also in such a manner as to afford no opportunity for displacement by any movement of the clothing or of the body.

An essential feature in the construction of my improved belt is that the same is provided with a central front section particularly adapted to fit about the abdomen, and is adjustably secured on either side to the remaining portion of the belt by a plurality of hooks and buckles attached to elastic tape through which the supporting pressure on the abdomen may be nicely adjusted.

Still another feature in the construction of this belt is that the same is made of canvas, or other suitable washable material, and is reinforced or stayed at intervals around it by means of straps formed of the same or similar material, thus doing away with the use of steel stays or whalebone, rendering the belt easily washable and therefore sanitary.

With these objects in view, the invention consists of certain novel features of construction as will be more fully described and particularly pointed out in the appended claim.

In the accompanying drawings: Figure 1—is a perspective view of the belt illustrating the short length of tubing for supporting the pessary between the front and back flaps of the belt. Fig. 2—is a front view of my improved belt. Fig. 3—is a rear view showing the length of flaps. Fig. 4—is a perspective view of the pessary showing the manner in which the two supporting flexible tubes pass therethrough. Fig. 5—is an enlarged view showing the attaching hook members and the sliding clasp for adjusting the same on the flexible tape. Fig. 6—is a detail showing one of the small tabs on the belt which is provided with an eye into which the ends of the flexible supporting tubing is fastened.

The belt is preferably made of stiff or heavy canvas and is shaped to fit the form around the lower portion of the waist. Said belt is preferably made in two portions. The back portion 1 extends from the back around toward the front a little more than half way on either side and is provided at intervals with vertical straps 3—3 preferably made of several thicknesses of the same material and secured in position by sewing, which straps stiffen and support the belt, preventing it from wrinkling or being drawn out of shape, thus doing away with the use of steel stays or whalebone which is ordinarily employed for this purpose.

Connected near the ends of the back portion on either side are a plurality of forwardly extending elastic tapes 4—4, (see Fig. 3) on which tapes are adjustably secured the buckles 5 and to one part of each buckle is secured a hook 6. This buckle is adapted to slide along said elastic tape and lock by means of the pins 7 at any convenient position, whereby the size of the belt may be nicely adjusted to regulate the supporting tension of the belt on the body. A downwardly extending portion or flap 8 is provided on the rear portion of the belt which is provided with a plurality of tabs 9—9, such as that illustrated in Fig. 6, said tabs being provided with eyes 10—10 through which the supporting elastic tubing may be passed and secured. A stiffening or supporting strap 10$^a$ also extends across this flap just above said tabs to give greater stability. The front portion of this belt is also made of stiff heavy canvas and provided with reinforcing straps which are stitched thereon up and down across the belt at 11 and also across the top of the flaps at 11$^a$, thereby rendering the same firm and strong so that it will retain its shape and not stretch out of position by the pressure brought to bear upon it. By constructing this front portion of canvas and providing the same with both vertical and horizontal ribs or straps, the same is adapted to yield readily to every motion of the body and at the same time support the parts and hold the same in position without discomfort to the wearer. This front section is provided with a downwardly extending portion or flap 12 which, like the back flap, is provided with two tabs 13—13 with eyes 14—14 through which the elastic supporting tubing is passed and secured. Each edge of this central section 2 is provided with eyes 15—15 which are fixed to the same by means of elastic loops 16, said eyes being fastened in position to correspond to the retaining hooks 6—6 on the back member on either side thereof, see Fig. 5. By means of these elongated flaps extending downward from both the front and back portions of this belt the pessary 17 is adapted to be supported securely in position by very short flexible tubes 18—18, thus affording a great advantage over other constructions where no flaps are used and the tubes are necessarily much longer, as it is found in practice that where the elastic tubes are short and are connected to the flaps that extend down a portion of the distance on both the front and back, the pessary is much more firmly retained and supported in position and is less easily displaced than when the tubes are longer and reach up to the belt.

My improved abdominal and uterus supporting belt is inexpensive in construction, may be readily adjusted to fit any figure, is flexible and yet firm in its retaining and supporting qualities, may be quickly applied and removed, is sanitary because of its adaptability to be so readily washed, and on account of its particular shape and construction is adapted to support the uterus by means of a pessary which is held by a flexible tension in the desired position against displacement by any movements of the clothing or the body and the same may be worn without the slightest discomfort to the wearer.

Having thus described my invention, what I claim as new and desire to secure by Letters Patent, is:

A combined abdominal belt and uterine supporter comprising a belt constructed of front and rear sections formed of fabric of approximately triangular shape, elastic straps secured to the rear section, buckles adjustably attached to said straps, hooks carried by said buckles, elastic straps secured to the front section, eyes carried thereby to engage said hooks, tabs secured to the apex of each triangular section, a stay extending transversely across the apex of each section adjacent the securing point of said tabs, vertical stays for each body section, all of said stays being formed of fabric and secured to said sections, a pessary, and flexible connections extending between the corresponding tabs of each body section and supporting the pessary.

In testimony whereof I affix my signature in presence of two witnesses.

ELIZABETH McGOVERN OMEARA.

Witnesses:
MARY A. McARDLE,
EDWARD G. CARR.